W. W. FORD.
WAVE MOTOR.
APPLICATION FILED FEB. 14, 1911.

997,663.

Patented July 11, 1911.

2 SHEETS—SHEET 2.

Witnesses
N. H. Lybrand
V. B. Hillyard

Inventor
William W. Ford
By Victor J. Evans
Attorney

UNITED STATES PATENT OFFICE.

WILLIAM W. FORD, OF CHINA, TEXAS.

WAVE-MOTOR.

997,663.   Specification of Letters Patent.   Patented July 11, 1911.

Application filed February 14, 1911.  Serial No. 608,529.

*To all whom it may concern:*

Be it known that I, WILLIAM W. FORD, a citizen of the United States, residing at China, in the county of Jefferson and State of Texas, have invented new and useful Improvements in Wave-Motors, of which the following is a specification.

The present invention is intended to supply a mechanism for utilizing the force of waves as motive power for operating machinery.

The invention contemplates a substantial structure forming a support for a line shaft, a series of pulleys mounted upon the shaft, a ratchet mechanism connecting each of the pulleys with the shaft, a series of floats, flexible connections between the floats and pulleys, and other flexible connections coöperating with the pulleys to take up the slack of the float connections when the floats rise.

The invention consists of the novel features, details of construction and combination of parts, which hereinafter will be more particularly set forth, illustrated in the accompanying drawings, and pointed out in the appended claim.

Figure 1:
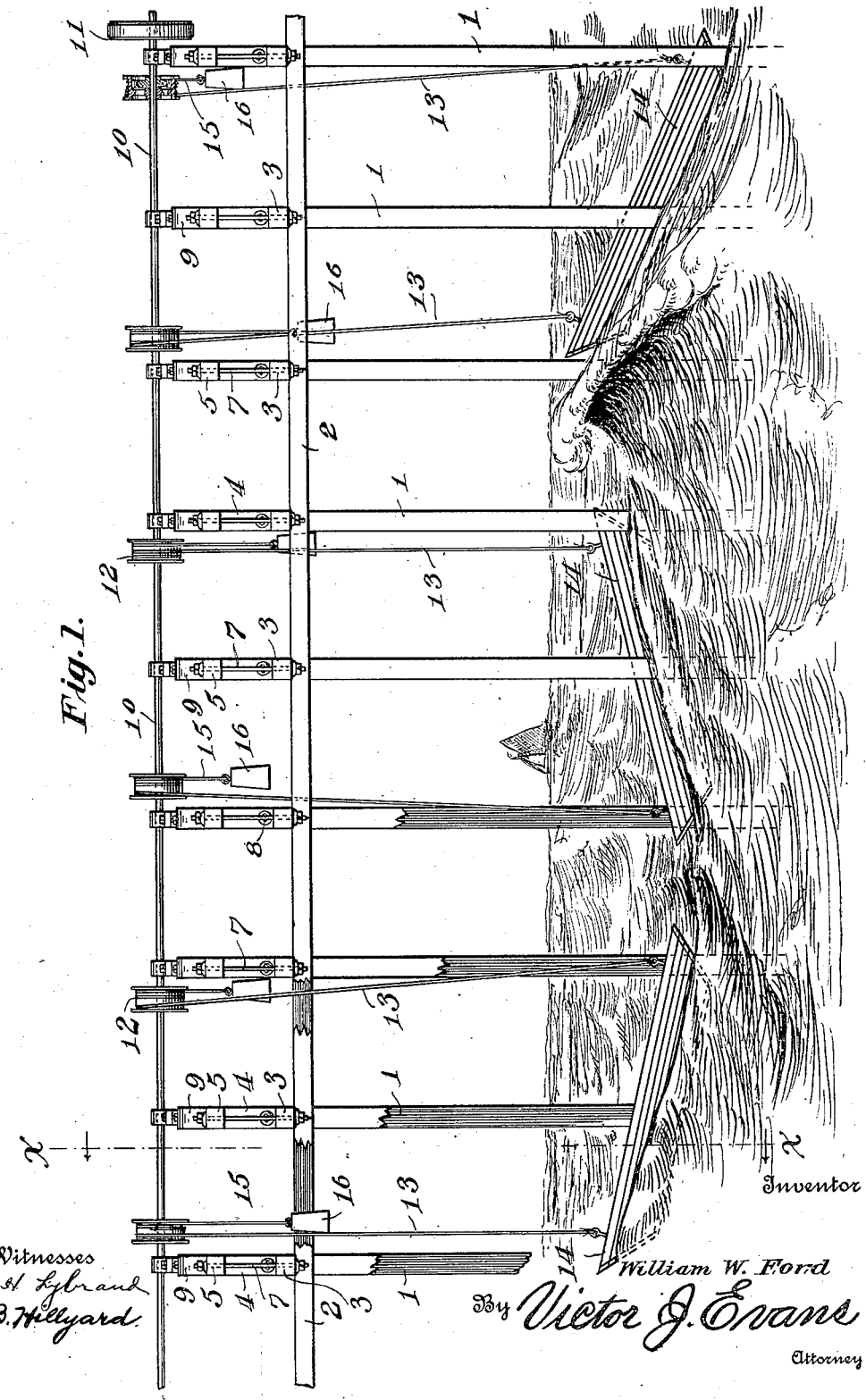
Figure 2:
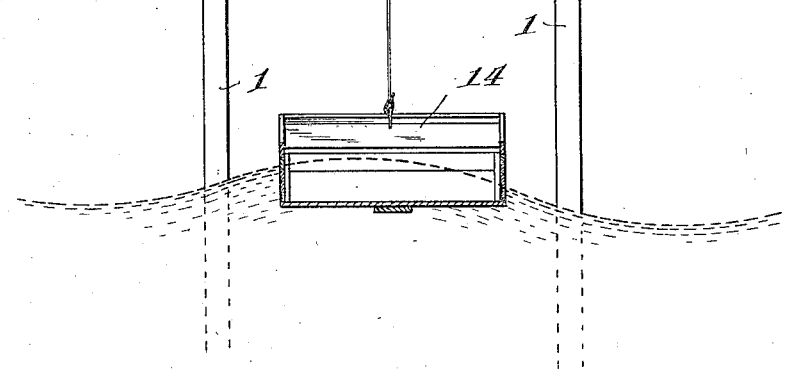
Figure 3:
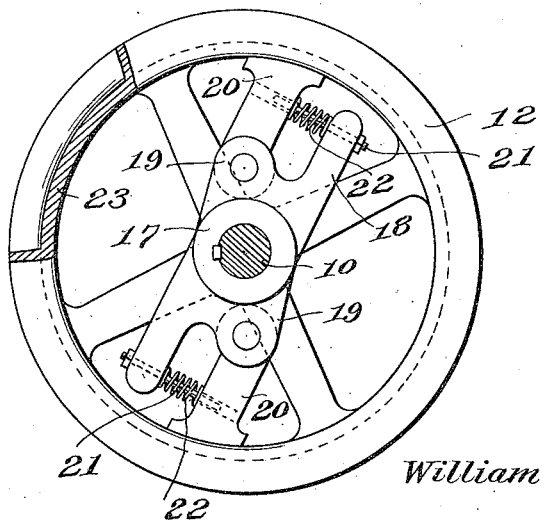

Referring to the drawings, forming a part of the specification, Figure 1 is a side elevation of a wave motor embodying the invention. Fig. 2 is a transverse section on the line $x$—$x$ of Fig. 1. Fig. 3 is a view in elevation of one of the pulleys, showing the shaft and the ratchet connection between the pulley and shaft.

Corresponding and like parts are referred to in the following description, and indicated in all the views of the drawings, by the same reference characters.

The framework comprises two lines of piles 1, headers 2 connecting the upper ends of the piles, cross pieces 3 connecting the headers, uprights 4 mounted upon end portions of the cross pieces 3, upper cross pieces 5, and braces 6, the cross pieces 3 and 5 being connected by tie rods 7 and the uprights 4 being connected by tie rods 8, which prevent the braces 6 from spreading at their lower ends. Blocks 9 are secured to the upper cross pieces 5 and are provided with bearings in which a line shafting 10 is mounted. The power may be taken from the line shafting in any manner, preferably by means of a band pulley 11. A series of pulleys 12 are loosely mounted upon the shaft 10 and have a ratchet connection therewith so as to impart a continuous rotary movement thereto in the same direction. Flexible connections 13 are connected with the pulleys 12 and have an end portion wound thereon in one direction, said flexible connections being attached at their lower ends to floats 14. The flexible connections 13 may consist of cables, chains, or the like. Other flexible connections 15 are attached to the pulleys 12 and are wound thereon in an opposite direction to the flexible connections 13. Weights 16 are attached to the lower ends of the flexible connections 15. When the floats 14 rise the weights 16 descend and turn the pulleys 12 upon the shaft 10, thereby taking up slack in the flexible connections 13. When the floats 14 descend they pull upon the flexible connections 13 and unwind the same from the pulleys 12 and rotate the latter and wind the flexible connections 15 thereon and at the same time the ratchet mechanism comes into play and causes rotation of the shaft 10. The floats 14 may be of any construction and usually consist of barges which are anchored or otherwise secured to prevent their being carried off by the tide or current, yet admitting of the floats having free movement to rise and fall with the motion of the waves. The floats 14 in conjunction with the weights 16 impart an oscillatory movement to the pulleys 12, thereby preventing any slack in the flexible connections 13 so that when the floats descend their weight may be utilized to cause rotation of the shaft 10 through the pulleys 12 and intermediate ratchet mechanism.

A frame 17 is had for each pulley and is keyed or otherwise secured to the shaft 10. This frame has oppositely extending arms 18 and oppositely disposed lugs 19, the latter being in line with a diameter of the pulley. The arms 18 have a tangential arrangement. Dogs 20 are pivoted at their inner ends to the lugs 19 and have a tangential arrangement and extend approximately parallel with the arms 18. Bolts or pins 21 connect outer portions of the dogs 20 with the outer ends of the arms 18 and springs 22 are mounted upon said bolts and are interposed between the dogs 20 and arms 18 and normally exert a pressure to hold the outer ends of the dogs 20 in engagement with the inner wall of the rim 23 of the pulley. The frames 17 are placed to one side of the respective pulleys and the latter have laterally extending rims which extend over the outer ends of the dogs 20 to be engaged thereby. When the pulleys turn to the right under the influence of the weighted connections 15 the dogs 20 release their grip, but when the pulleys 12 are turned to the left under the influence of the descending weight of the floats the dogs 20 grip the rim 23 and cause the shaft 10 to rotate with the pulleys. By providing a plurality of floats, pulleys and intermediate connections the shaft 10 has practically a continuous rotary movement imparted thereto, since some one or more of the floats will gravitate while others are rising on the crest of the waves so as to descend when the wave recedes. The springs 22 are expansible and of helical form and possess sufficient tension to cause the dogs 20 to instantly and firmly grip the rims of the pulleys when the floats descend and to release their hold upon said rims when the floats rise.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A wave motor comprising a framework embodying spaced rows of piles, headers connecting the upper ends of the piles, cross pieces connecting the headers, uprights mounted upon end portions of the cross pieces upper cross pieces supported upon the uprights, braces between the lower ends of the uprights and the upper cross pieces, tie rods connecting end portions of the upper and lower cross pieces and the lower ends of the uprights, a line shafting mounted upon the upper cross pieces, pulleys loosely mounted upon the line shafting, flexible connections secured to the pulleys and wound thereon in one direction, floats attached to the lower ends of the flexible connections, other flexible connections attached to the pulleys and wound thereon in an opposite direction to the first mentioned flexible connections, weights attached to the last mentioned flexible connections, and a ratchet connection between each of the pulleys and the line shafting.

In testimony whereof I affix my signature in presence of two witnesses.

WILLIAM W. FORD.

Witnesses:
 Frank Smart,
 Jos. A. Smith.

---

Copies of this patent may be obtained for five cents each, by addressing the "Commissioner of Patents, Washington, D. C."